US009248704B2

(12) United States Patent
Bourgeois et al.

(10) Patent No.: US 9,248,704 B2
(45) Date of Patent: Feb. 2, 2016

(54) TIRE WITH IMPROVED BEADS

(75) Inventors: Frederic Bourgeois, Clermont-Ferrand (FR); Francois-Xavier Bruneau, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 338 days.

(21) Appl. No.: 14/000,309

(22) PCT Filed: Feb. 16, 2012

(86) PCT No.: PCT/EP2012/052712
§ 371 (c)(1),
(2), (4) Date: Sep. 20, 2013

(87) PCT Pub. No.: WO2012/110612
PCT Pub. Date: Aug. 23, 2012

(65) Prior Publication Data
US 2014/0008002 A1 Jan. 9, 2014

Related U.S. Application Data

(60) Provisional application No. 61/480,358, filed on Apr. 28, 2011.

(30) Foreign Application Priority Data

Feb. 17, 2011 (FR) ...................................... 11 51289

(51) Int. Cl.
*B60C 15/00* (2006.01)
*B60C 15/06* (2006.01)

(52) U.S. Cl.
CPC ......... *B60C 15/0603* (2013.04); *B60C 15/0027* (2013.04); *B60C 15/06* (2013.01); *B60C 15/0607* (2013.04); *B60C 2015/009* (2013.04); *B60C 2015/0621* (2013.04)

(58) Field of Classification Search
CPC .... B60C 15/00; B60C 15/0027; B60C 15/06; B60C 15/0603; B60C 15/0607
See application file for complete search history.

(56) References Cited

U.S. PATENT DOCUMENTS

2010/0224300 A1 9/2010 Maruoka

FOREIGN PATENT DOCUMENTS

EP 0 810 106 12/1997
EP 1559535 * 8/2005
(Continued)

*Primary Examiner* — Justin Fischer
(74) *Attorney, Agent, or Firm* — Cozen O'Connor

(57) ABSTRACT

Tire comprising two beads comprising an annular reinforcing structure, a carcass reinforcement anchored in the two beads so as to form a main portion and a wrapped-around portion, each wrapped-around portion extending radially outwards as far as an end situated at a radial distance DEC that is less than or equal to 10% of the radial height H of the tire; each bead comprising an apex made of a rubber composition having an elastic modulus greater than 40 MPa, extending radially as far as a radial distance DEE1 comprised between 10% and 15% of the height H; each bead further comprising an outer strip made of a rubber composition that has an elastic modulus G' less than or equal to 15 MPa and a viscous modulus G" such that: G"[MPa]≤0.2·G'[MPa]−0.2 MPa, extending at least between 20% and 25% of the height H, the apex having an axial thickness E(r) that is substantially a linear function of r, r denoting the distance with respect to the radially innermost point of the annular structure, wherein the entity formed by the apex and outer strip has a thickness ET(r) such that, in the range of distances r comprised between 25 and 45% of the height H of the tire, the variation in thickness $$\frac{\partial ET(r)}{\partial r}$$

is negative and has an absolute value that is greater than or equal to 0.25 mm/mm over at least 4% of the height H; and wherein said annular structure has a maximum axial width DE such that the ratio $$\frac{ET(r)_{max} - DE}{ET(r)_{max}},$$

where $ET(r)_{max}$ is the maximum value of the thickness $ET(r)$, is less than 10%.

5 Claims, 5 Drawing Sheets

(56) References Cited

FOREIGN PATENT DOCUMENTS

| | | | |
|---|---|---|---|
| JP | 52131305 | * | 11/1977 |
| JP | 55-132312 | * | 10/1980 |
| JP | 58004611 | * | 1/1983 |
| JP | 59089206 | * | 5/1984 |
| JP | 62004614 | * | 1/1987 |
| JP | 2002-200905 | * | 7/2002 |
| JP | 2003-154818 | * | 5/2003 |
| JP | 2005-67471 | * | 3/2005 |
| WO | WO 2004/033789 | * | 4/2004 |
| WO | WO 2007/003246 | * | 1/2007 |
| WO | WO 2007/042119 | * | 4/2007 |
| WO | WO 2010/072736 | | 7/2010 |

\* cited by examiner

TIRE WITH IMPROVED BEADS

RELATED APPLICATIONS

This is a U.S. National Phase application under 35 USC §371 of international application PCT/EP2010/052712, filed on Feb. 16, 2012.

This application claims the priority of French patent application Ser. No. 11/51289 filed Feb. 17, 2011 and U.S. provisional patent application No. 61/480,358 filed Apr. 28, 2011, the entire content of both of which are hereby incorporated by reference.

FIELD OF THE INVENTION

The present invention relates to passenger vehicle tires with a load index in excess of 100, like most tires for 4×4 vehicles and for vans. The invention relates, in particular, to the beads of these tires.

BACKGROUND

The load index of a tire is a parameter well known to those skilled in the art that quantifies the maximum load that the tire is able to bear when mounted on a rim and inflated to service pressure. A load index of 100 corresponds to a maximum load of 800 kg.

Most passenger vehicle tires comprise:
two beads designed to come into contact with a rim, each bead comprising at least one annular reinforcing structure;
two sidewalls extending the beads radially outwards, the two sidewalls meeting in a crown comprising a crown reinforcement surmounted by a tread;
at least one carcass reinforcement extending from the beads through the sidewalls as far as the crown, the carcass reinforcement comprising a plurality of carcass reinforcing elements and being anchored in the two beads by a turn-up around the annular reinforcing structure so as to form, within each bead, a main portion and a wrapped-around portion;
an apex situated radially on the outside of the annular reinforcing structure and at least partially between the main portion and the wrapped-around portion of the carcass reinforcement, and
an outer strip positioned axially on the outside of the carcass reinforcement and of the apex.

Recently, there have been proposals to improve the rolling resistance of passenger vehicle tires by optimizing the beads thereof. Document WO 2010/072736 notably teaches the use of special rubber compositions: the outer strip and possibly the apex are made using rubber compositions that have an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C.

That document also recommends further reducing the rolling resistance by optimizing the geometry of those portions of the tire that have these moduli: the portion of rubber composition having an elastic modulus G' less than or equal to 15 MPa and a viscous modulus G" such that:

$$G''[\text{MPa}] \leq 0.2 \cdot G'[\text{MPa}] - 0.2 \text{ MPa},$$

has, in any radial cross section, a thickness Ep(r), this thickness corresponding to the length of the intersection of the direction perpendicular to the main portion of the carcass reinforcement with the said portion of rubber composition, r denoting the distance separating the intersection of the said direction perpendicular to the main portion of the carcass reinforcement with the main portion of the carcass reinforcement from the radially innermost point of the annular reinforcing structure. The thickness Ep(r) changes in such a way that, in the range of distances r comprised between 20 and 50 mm, the variation in thickness $$\frac{\partial Ep(r)}{\partial r}$$

is negative and has an absolute value that is greater than or equal to 0.25 mm/mm (i.e. the value is below −0.25 mm/mm) over at least 5 mm. In other words, it is advantageous to ensure that the entity formed by the apex and the outer strip is "squat", that is say shorter and wider than in conventional tires.

When implementing this teaching in tires designed to be fitted to vehicles of the "4×4" type that have a load index in excess of 100—tires which traditionally have had very stiff (in excess of 50 MPa) apexes—it has been found that the incorporation of thick outer strips presents a problem of industrial robustness. More specifically, because the quantities of rubber composition involved are fairly great, it is difficult to prevent rubber from moving while the tires are being cured. As a result, the proportion of tires that fail to meet the specifications increases significantly.

In order to limit this problem, the applicant has found that it is advantageous to give the annular reinforcing structure a maximum axial width DE such that the ratio $$\frac{Ep(r)_{max} - DE}{Ep(r)_{max}},$$

where $Ep(r)_{max}$ is the maximum value of the thickness $Ep(r)$, is less than or equal to 10%.

One difficulty associated with implementing these solutions is their relatively high cost which is notably due to the use of apexes and thick outer strips made of rubber compositions that have a low elastic modulus.

SUMMARY OF THE INVENTION

One of the objects of the present invention is to provide a tire with a load index that is high, despite the presence of just one carcass reinforcement, and excellent rolling resistance while at the same time allowing an increase in manufacturing productivity and a lower cost. This objective is achieved by shortening the turn-up of the carcass reinforcement, while at the same time providing an apex with a high elastic modulus, the volume of which is small.

More specifically this object is achieved by a tire comprising:
two beads designed to come into contact with a rim, each bead comprising at least one annular reinforcing structure;
two sidewalls extending the beads radially outwards, the two sidewalls meeting in a crown comprising a crown reinforcement surmounted by a tread;
one single carcass reinforcement extending from the beads through the sidewalls as far as the crown, the carcass reinforcement comprising a plurality of carcass reinforcing elements, the carcass reinforcement being anchored in the two beads by a turn-up around the annular reinforcing structure so as to form, within each bead, a main portion and a wrapped-around portion, each wrapped-around portion extending radially outwards as far as an end situated a radial distance DEC from the innermost point of the annular reinforcing structure of the bead, the radial distance DEC being less than or equal to 10% (and preferably less than or equal to 8%), of the radial height H of the tire, Each bead comprises an apex made from a rubber composition that has an elastic modulus greater than or equal to 40 MPa, the apex being situated essentially radially on the outside of the annular reinforcing structure and at least partially between the main portion and the wrapped-around portion of the carcass reinforcement. The apex extends radially as far as a radially outer end of the apex, the radially outer end of the apex being situated a radial distance DEE1 from the radially innermost point of the annular reinforcing structure of the bead, the radial distance DEE1 being greater than or equal to 10% and less than or equal to 15% of the radial height H of the tire.

Each bead further comprises an outer strip made of a rubber composition that has an elastic modulus G' less than or equal to 15 MPa and a viscous modulus G'' such that:

$$G''[\text{MPa}] \leq 0.2 \cdot G'[\text{MPa}] - 0.2 \text{ MPa},$$

the elastic and viscous moduli being measured at 23° C.

The outer strip is situated axially on the outside of the wrapped-around portion of the carcass reinforcement, the outer strip extending between a radially inner end of the outer strip and a radially outer end of the outer strip. The radially inner end of the outer strip is situated at a radial distance DEI2 from the radially innermost point of the annular reinforcing structure of the bead, the radial distance DEI2 being less than or equal to 20% of the radial height H of the tire. The radially outer end of the outer strip is situated at a radial distance DEE2 from the radially innermost point of the annular reinforcing structure of the bead, the radial distance DEE2 being greater than or equal to 25% (and preferably greater than or equal to 40%) of the radial height H of the tire. For preference, the radial distance DEE2 is less than or equal to 45% of the radial height H of the tire.

The apex has an axial thickness E(r), this axial thickness corresponding to the length of the intersection of the apex with an axial direction, r denoting the distance separating the point of intersection of the said axial direction with the main portion of the carcass reinforcement from the radially innermost point of the annular reinforcing structure, the thickness E(r) being a substantially linear function of r.

The entity formed by the apex and the outer strip has a thickness ET(r), this thickness corresponding to the length of the intersection of the direction perpendicular to the main portion of the carcass reinforcement with the said entity, r denoting the distance separating the point of intersection of the said direction perpendicular to the main portion of the carcass reinforcement with the main portion of the carcass reinforcement from the radially innermost point of the annular reinforcing structure, wherein the thickness ET(r) changes in such a way that, in the range of distances r comprised between 25 and 45% of the height H of the tire, the variation in thickness $$\frac{\partial ET(r)}{\partial r}$$

is negative and has an absolute value that is greater than or equal to 0.25 mm/mm (i.e. the value is below −0.25 mm/mm), and preferably greater than or equal to 0.3 mm/mm, over at least 4% of the height H of the tire.

Moreover, the said at least one annular reinforcing structure has a maximum axial width DE such that the ratio $$\frac{ET(r)_{max} - DE}{ET(r)_{max}},$$

wherein $ET(r)_{max}$ is the maximum value of the thickness ET(r), is less than or equal to 10%.

DETAILED DESCRIPTION OF THE DRAWINGS

Figure 1:
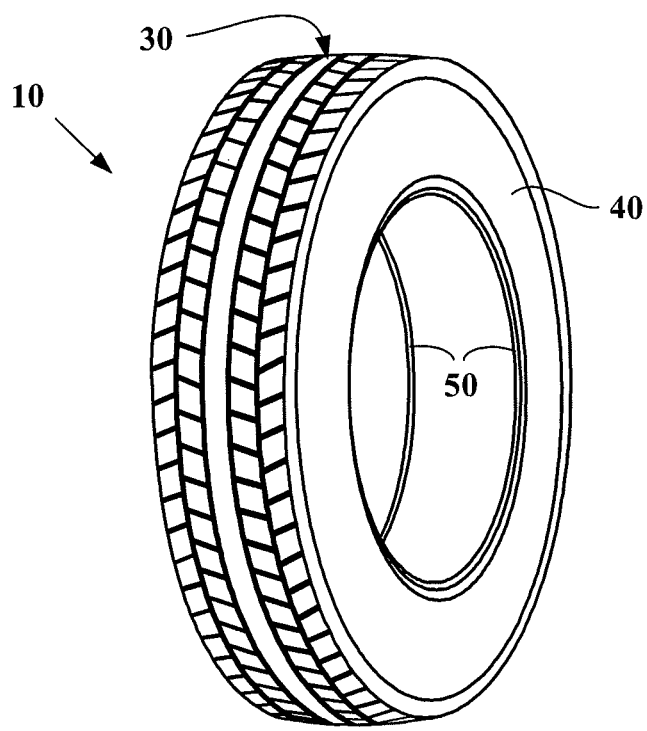
FIG. 1 depicts a tire according to the prior art.

In the use of the term "radial" it is appropriate to make a distinction between several different ways in which the person skilled in the art uses this word. Firstly the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress is said to be made "radially inwards (or outwards)" when progressing towards smaller (or larger) radii. Where radial distances are involved, it is this sense of the term that applies also.

By contrast, a thread or reinforcement is said to be "radial" when the thread or the reinforcing elements of the reinforcement make an angle greater than or equal to 80° and less than or equal to 90° with the circumferential direction. Please note that in this document, the term "thread" is to be understood in an entirely general sense and encompasses threads in the form of monofilaments, multifilaments, cords, yarns or equivalent assemblies, that being the case irrespective of the material of which the thread is made or the surface treatment it may have received to enhance its bonding with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further away from the median plane of the tire than is the point P8. The "median plane" of the tire is the plane perpendicular to the axis of rotation of the tire and which lies equidistant between the annular reinforcing structures of each bead.

A "circumferential" direction is a direction perpendicular both to a radius of the tire and to the axial direction.

Within the context of this document, the expression "rubber composition" denotes a rubber composition containing at least an elastomer and a filler.

The "elastic modulus" of a rubber composition means the secant tensile modulus obtained under tension in accordance with standard ASTM D 412, 1998 (test specimen "C"): the apparent secant moduli at 10% elongation, denoted "MA10" and expressed in MPa are measured in second elongation (that is to say after an accommodation cycle) under normal temperature and relative humidity conditions in accordance with ASTM D 1349, 1999.

When the thickness $E(r)$ is said to be "a substantially linear function of r" this means that the absolute value of the coefficient of linear correlation R between r and $E(r)$ is greater than or equal to 0.95. In more mathematical terms, for N test specimens measured $(r_i, E(r_i))$, $i=1, \ldots N$, the value $$|R| = \left| \frac{\sum_{i=1}^{N}\left(r_i - \frac{1}{N}\cdot\sum_{j=1}^{N}r_j\right)\cdot\left(E(r_i) - \frac{1}{N}\cdot\sum_{k=1}^{N}E(r_k)\right)}{\sqrt{\sum_{i=1}^{N}\left(r_i - \frac{1}{N}\cdot\sum_{j=1}^{N}r_j\right)^2}\cdot\sqrt{\sum_{i=1}^{N}\left(E(r_i) - \frac{1}{N}\cdot\sum_{k=1}^{N}E(r_k)\right)^2}} \right|$$

is greater than or equal to 0.95. For preference, the thickness $E(r)$ varies such that this value is even greater than or equal to 0.98.

FIG. 1 schematically depicts a tire 10 according to the prior art. The tire 10 comprises a crown comprising a crown reinforcement (not visible in FIG. 1) surmounted by a tread 30, two sidewalls 40 extending the crown radially inwards, and two beads 50 radially on the inside of the sidewalls 40.

Figure 2:
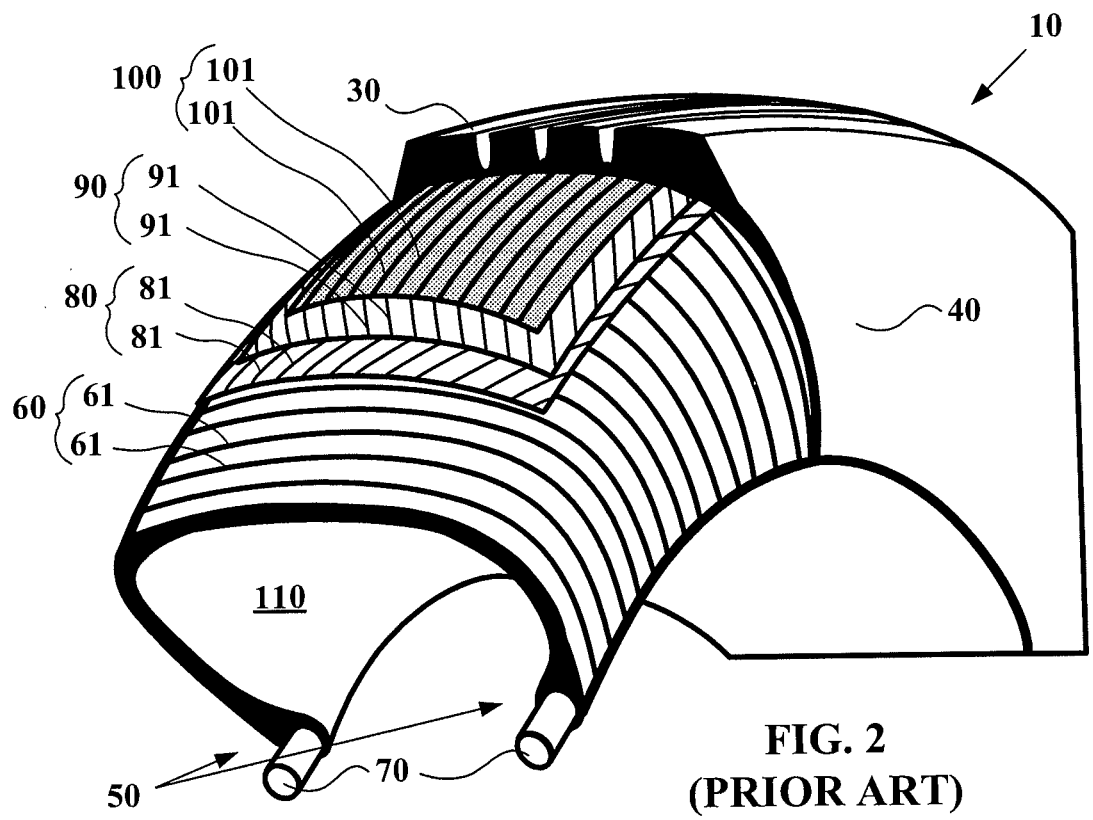
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 consisting of threads 61 coated with rubber composition, and two beads 50 each comprising circumferential reinforcing structures 70 (in this case bead wires) which hold the tire 10 on the rim (not depicted). The carcass reinforcement 60 is anchored in each of the beads 50. The tire 10 further comprises a crown reinforcement comprising two plies 80 and 90. Each of the plies 80 and 90 is reinforced by thread-like reinforcing elements 81 and 91 which are parallel within each layer and crossed from one layer to the other, making angles comprised between 10° and 70° with the circumferential direction. The tire also comprises a hooping reinforcement 100, positioned radially on the outside of the crown reinforcement, this hooping reinforcement being formed of reinforcing elements 101 directed circumferentially and wound in a spiral. A tread 30 is laid on the hooping reinforcement; it is this tread 30 which provides contact between the tire 10 and the road. The tire 10 depicted is a "tubeless" tire: it comprises an "inner liner" 110 made of a rubber composition impervious to the inflating gas, covering the interior surface of the tire.

Figure 3:
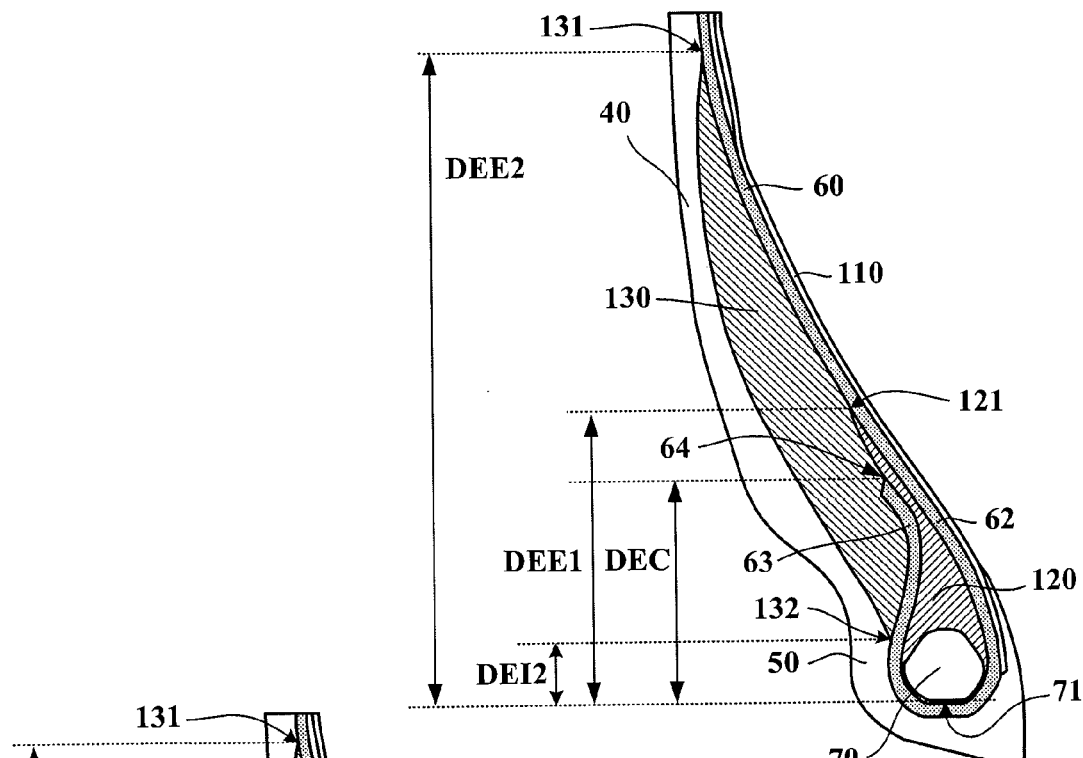
FIG. 3 depicts, in radial section, a portion of a reference tire.

FIG. 3 schematically depicts, in radial section, a portion of a reference tire. This tire, which is structurally similar to the tires disclosed in the document WO 2010/072736, comprises two beads 50 designed to come into contact with a rim (not depicted), each bead comprising an annular reinforcing structure, in this instance a bead wire 70. The tire additionally comprises two sidewalls 40 which extend the beads 50 radially outwards. One single carcass reinforcement 60 extends from the beads 50 through the sidewalls 40. It is anchored in the two beads by a turn-up around the bead wire 70, so as to form, in each bead, a main portion 62 and a wrapped-around portion 63, each wrapped-around portion extending radially outwards as far as an end 64. This end is situated a radial distance DEC from the radially innermost point 71 of the bead wire 70, the radial distance DEC here being equal to 14% of the radial height H of the tire.

Figure 4:
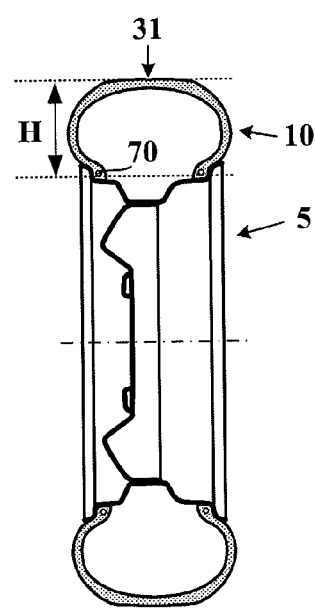
FIG. 4 illustrates how the height H of the tire is determined.

The "radial height" H of a tire is defined as being the radial distance between the radially innermost point 71 of the annular reinforcing structure 70 of the bead 50 and the radially outermost point 31 (FIG. 4) of the tread 30 when the tire is mounted on a rim 5 (as has been depicted in FIG. 4) and inflated to its service pressure.

Each bead comprises an apex 120 made from a rubber composition that has an elastic modulus G' equal to 5 MPa and a viscous modulus G" equal to 0.8 MPa, the elastic and viscous moduli being measured at 23° C.

The apex 120 is situated substantially radially on the outside of the bead wire 70 and at least partially between the main portion 62 and the wrapped-around portion 63 of the carcass reinforcement 60. The apex 120 extends radially as far as a radially outer end 121 situated a radial distance DEE1 from the radially innermost point 71 of the bead wire 70. The radial distance DEE1 here is equal to 19% of the radial height H of the tire.

Each bead 50 additionally comprises an outer strip 130 made of the same rubber composition as the apex 120. The outer strip 130 is situated axially outside the wrapped-around portion 63 of the carcass reinforcement and extends between a radially inner end 132 and a radially outer end 131. The radially inner end 132 of the outer strip 130 is situated a radial distance DEI2 from the radially innermost point 71 of the bead wire 70, the radial distance DEI2 being, in this instance equal to 4% of the radial height H of the tire. The radially outer end 131 of the outer strip 130 is situated a radial distance DEE2 from the radially innermost point of the annular reinforcing structure of the bead, the radial distance DEE2 here being equal to 41% of the radial height H of the tire.

The interior surface of the tire is covered with an inner liner 110.

Figure 5:
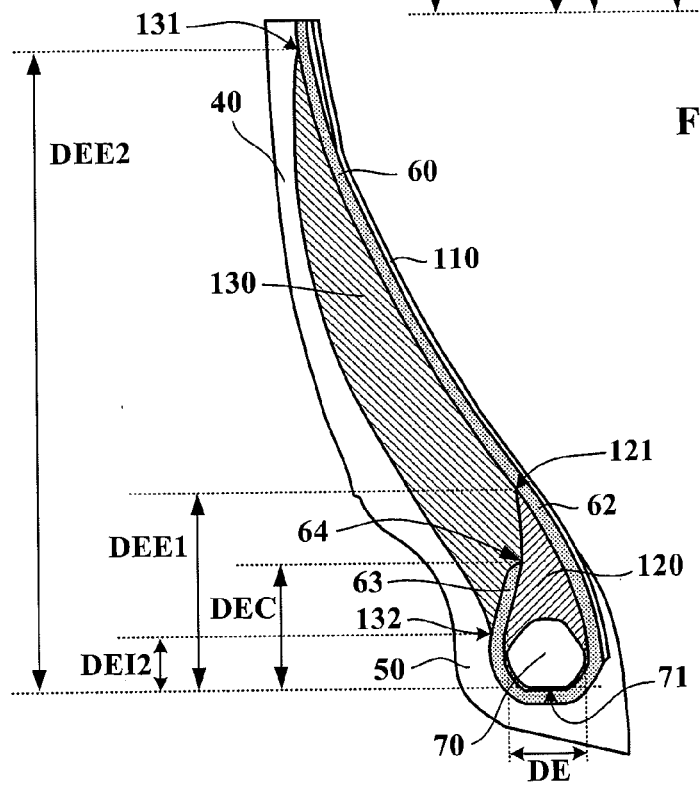
FIG. 5 depicts, in radial section, a portion of a tire according to an embodiment of the invention.

FIG. 5 depicts, in radial section, a portion of a tire according to an embodiment of the invention. This tire comprises two beads 50 designed to come into contact with a rim (not depicted), each bead 50 comprising a bead wire 70 and two sidewalls 40 extending the beads 50 radially outwards. The two side walls meet in a crown (not depicted) comprising a crown reinforcement surmounted by a tread. The tire further comprises a single carcass reinforcement 60 extending from the beads 50 through the sidewalls 40 as far as the crown. The carcass reinforcement comprises a plurality of carcass reinforcing elements. It is anchored in the two beads by a turn-up around the bead wire 70, so as to form, in each bead, a main portion 62 and a wrapped-around portion 63. Each wrapped-around portion 63 extends radially on the outside as far as an end 64 situated a radial distance DEC from the radially innermost point 71 of the bead wire 70, the radial distance DEC in this instance being equal to 8% of the radial height H of the tire.

The bead 50 comprises an apex 120 made of a rubber composition that has an elastic modulus greater than or equal to 40 MPa. The apex 120 is for the most part situated radially on the outside of the bead wire 70 and at least partially between the main portion 62 and the wrapped-around portion 63 of the carcass reinforcement 60. The apex 120 extends radially as far as a radially outer end 121 of the apex 120, the radially outer end 121 of the apex being situated a radial distance DEE1 from the radially innermost point 71 of the annular reinforcing structure of the bead, the radial distance DEE1 in this instance being equal to 13% of the radial height H of the tire.

Each bead additionally comprises an outer strip 130 made from a rubber composition that has an elastic modulus G' less than or equal to 15 MPa and a viscous modulus G" such that:

$$G"[MPa] \leq 0.2 \cdot G'[MPa] - 0.2 \text{ MPa},$$

the elastic and viscous moduli being measured at 23° C.

Table I gives, by way of example, the formula of two rubber compositions that can be used to form an outer strip suitable for a tire according to an embodiment of the invention. The composition is given in phr ("per hundred rubber"), that is to say in part by weight per 100 parts by weight of rubber. The corresponding dynamic moduli are also indicated.

TABLE 1

| Parts in phr | Compound 1 | Compound 2 |
| --- | --- | --- |
| NR [1] | 100 | 100 |
| N 330 | | |
| N 990 | 85 | 85 |
| Graphite | 40 | |
| Antioxidant (6PPD) [2] | 2 | 2 |
| Cobalt naphthenate | 3 | 3 |
| Stearic acid | 1 | 1 |
| ZnO | 7 | 7 |
| Sulfur | 7 | 7 |
| Accelerator (TBBS) [3] | 1 | 1 |
| G' | 5 | 2 |
| G" | 0.8 | 0.2 |

Notes for Table 1:
[1] Natural rubber
[2] N-(1,3-dimethylbutyl)-N'-phenyl-p-phenylenediamine
[3] N-tert-butyl-2-benzothiazyl sulfonamide The rubber composition is preferably based on at least one diene elastomer, a reinforcing filler and a cross-linking system.

What is meant by a "diene" elastomer (interchangeable with rubber) is, in the known way, an elastomer derived at least in part (i.e. a homopolymer or a copolymer) from diene monomers, i.e. monomers which have two carbon-carbon double bonds, which may or may not be conjugated bonds. The diene elastomer used is preferably chosen from the group consisting of polybutadienes (BR), natural rubber (NR), synthetic polyisoprenes (IR), butadiene-styrene copolymers (SBR), isoprene-butadiene copolymers (BIR), isoprene styrene copolymers (SIR), butadiene-styrene-isoprene copolymers (SBIR) and blended mixtures of these elastomers.

One preferred embodiment consists in using an "isoprene" elastomer, that is to say a homopolymer or a copolymer of isoprene, or in other words a diene elastomer chosen from the group consisting of natural rubber (NR), synthetic polyisoprenes (IR), the various copolymers of isoprene and blended mixtures of these elastomers.

The isoprene elastomer is preferably natural rubber or synthetic polyisoprene of the cis-1,4 type. Of the synthetic polyisoprenes, those used for preference are polyisoprenes that have a ratio (molar %) of cis-1,4 bonds in excess of 90%, more preferably still in excess of 98%. According to other preferred embodiments, the diene elastomer may consist, fully or in part, of some other diene elastomer such as, for example, SBR elastomer (E-SBR or S-SBR) used either cut with some other elastomer, for example of the BR type, or uncut.

The rubber composition may also contain all or some of the additives customarily used in rubber matrices that are appropriate for the manufacture of tires, such as, for example, reinforcing fillers such as carbon black or inorganic fillers such as silica, coupling agents for inorganic fillers, anti-aging agents, antioxidants, plasticizers or extension oils, whether the latter be of the aromatic or non-aromatic kind (notably oils that are very weakly aromatic or non-aromatic, for example of the napthene or paraffin type, with a high or preferably a low viscosity, MES or TDAE oils, plasticizing resins with a high Tg in excess of 30° C.), processability agents that make the compositions easier to process in the raw state, tackifying resins, a cross-linking system based either on sulfur or on sulfur donors, and/or on peroxide, accelerators, vulcanization activators or retarders, anti-reversion agents, methylene acceptors and donors such as HMT (hexamethylenetetramine) or H3M (hexamethoxymethylmelamine) for example, reinforcing resins (such as resorcinol or bismaleimide), known adhesion promoting systems of the metallic salts type for example, notably cobalt or nickel salts.

The compositions are manufactured in suitable mixing mills using two successive phases of preparation well known to those skilled in the art: a first phase of thermomechanical kneading or work (the so-called "non-productive" phase) carried out at high temperature, up to a maximum temperature comprised between 110° C. and 190° C., preferably between 130° C. and 180° C., followed by a second phase of mechanical work (the so-called "productive" phase) up to a lower temperature, typically below 110° C., during which finishing phase the cross-linking system is incorporated.

By way of example, the non-productive phase is carried out in a single thermomechanical step lasting a few minutes (for example between 2 and 10 min) during which all the basic components needed together with other additives with the exception of the cross-linking or vulcanizing system are introduced into an appropriate mixing mill such as a customary internal mixing mill. Once the blended mixture thus obtained has cooled, the vulcanizing system is then incorporated in an external mixing mill such as an open mill kept at low temperature (for example between 30° C. and 100° C.). Everything is then kneaded (productive phase) for a few minutes (for example between 5 and 15 min).

The final composition thus obtained is then calendered, for example rolled into the form of a sheet or slab for characterizing, or alternatively is extruded to form the outer strip used in a tire according to an embodiment of the invention.

Vulcanizing (or curing) can then take place in the known manner at a temperature generally comprised between 130° C. and 200° C., preferably under pressure, for a long enough length of time that may vary for example between 5 and 90 min notably according to the curing temperature, to the vulcanizing system adopted and to the vulcanizing dynamics of the composition in question.

The outer strip 130 is situated axially on the outside of the wrapped-around portion 63 of the carcass reinforcement and extends between a radially inner end 132 and a radially outer end 131. The radially inner end 132 of the outer strip 130 is situated a radial distance DEI2 from the radially innermost point 71 of the annular reinforcing structure 70 of the bead 50, the radial distance DEI2 in this instance being equal to 4% of the radial height H of the tire. The radially outer end 131 of the outer strip 130 is situated a radial distance DEE2 from the radially innermost point 71 of the annular reinforcing structure 70 of the bead 50, the radial distance DEE2 in this instance being equal to 41% of the radial height H of the tire.

The apex 120 has an axial thickness E(r), this axial thickness corresponding to the length of the intersection between the apex 120 and an axial direction, r denoting the distance separating the point of intersection of the said axial direction with the main portion 62 of the carcass reinforcement 60 from the radially innermost point 71 of the annular reinforcing structure 70, the axial thickness E(r) being a substantially linear function of r.

Figure 6:
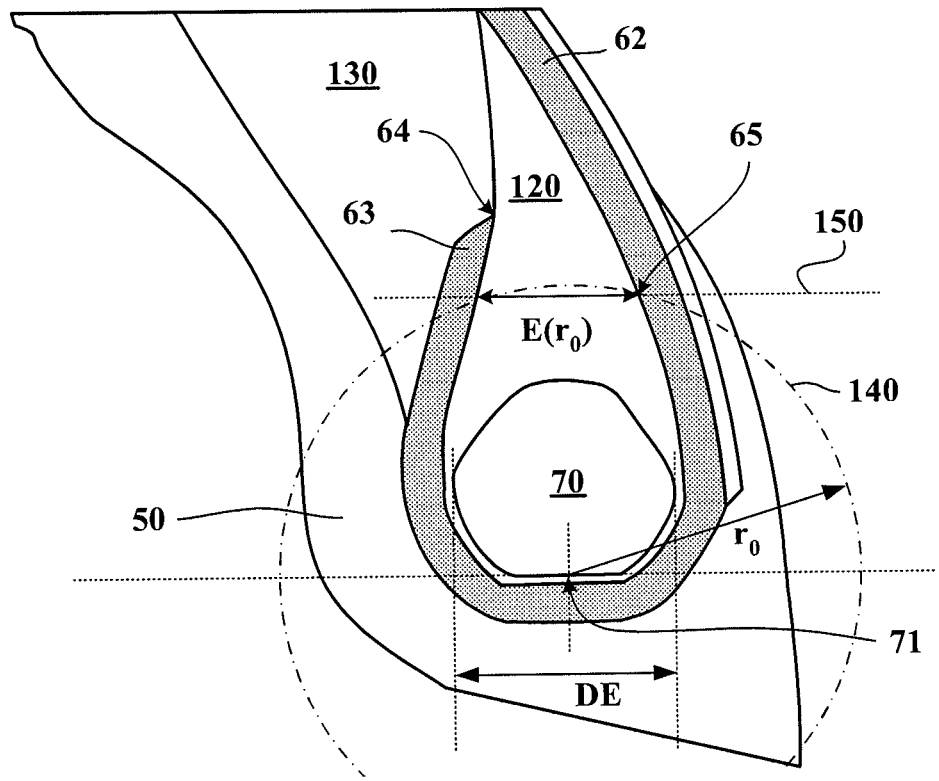
FIG. 6 depicts a detail of FIG. 5, illustrating, in particular, how the axial thickness E(r) of the apex is determined.

FIG. 6 illustrates how this axial thickness E(r) is determined. Following the interface between the main portion 62 of the carcass reinforcement and the apex 120, each point on this interface is a distance r from the radially innermost point 71 of the annular reinforcing structure 70. If there are several radially innermost points of the annular reinforcing structure, then any arbitrary one of these points is chosen as reference. For a given distance $r_0$, the corresponding point 65 of the interface is obtained by plotting a circle 140 of radius $r_0$ about the radially innermost point 71 of the annular reinforcing structure 70. Next, the axial direction 150 that passes through the point 65 of the interface is plotted. The thickness $E(r_0)$ of the apex 120 corresponds to the length of the intersection of the direction 150 with the apex 120.

Figure 7:
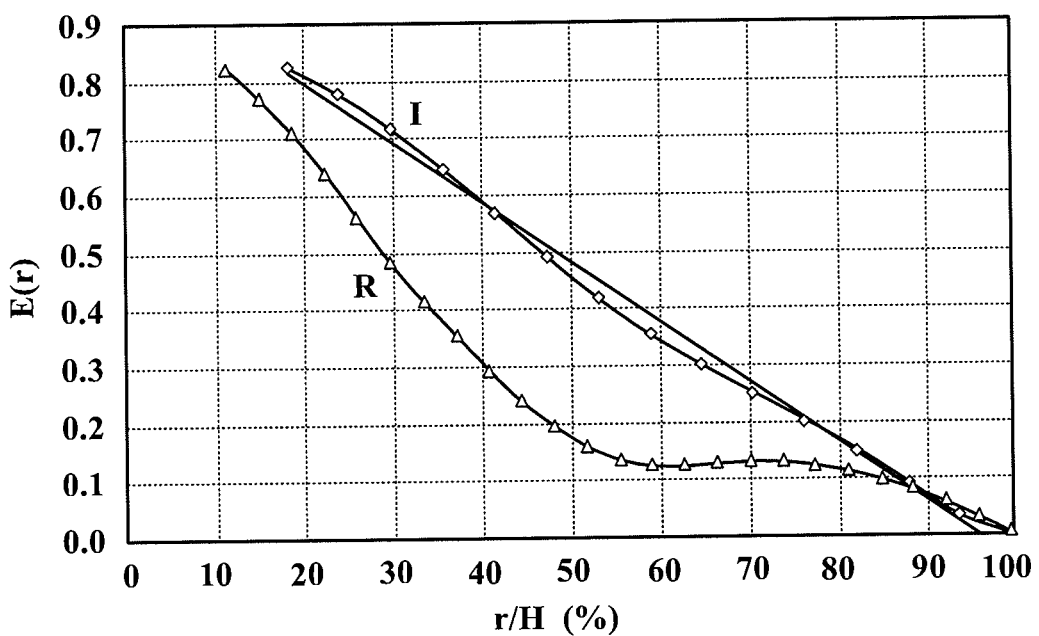
FIG. 7 shows the change of the axial thickness E(r) of the apex as a function of the distance r.

FIG. 7 shows the change of the axial thickness E(r) of the apex as a function of the distance r, divided by the height H of the tire, both for the reference tire depicted in FIG. 3 (curve "R" using triangle symbols) and for the tire according to an embodiment of the invention depicted in FIG. 5 (curve "I", using diamond symbols). In the latter instance, the result of the linear regression is also depicted. The absolute value for the coefficient of linear correlation r is equal to 0.83 for curve "R" and to 0.99 for the curve "I". Put differently, in the tire according to an embodiment of the invention, unlike the reference tire, the axial thickness E(r) is a substantially linear function of r.

The entity formed by the apex 120 and the outer strip 130 has a thickness ET(r). This thickness corresponds to the length of the intersection of the direction perpendicular to the main portion 62 of the carcass reinforcement 60 with the said entity, r being defined as hereinabove.

Figure 8:
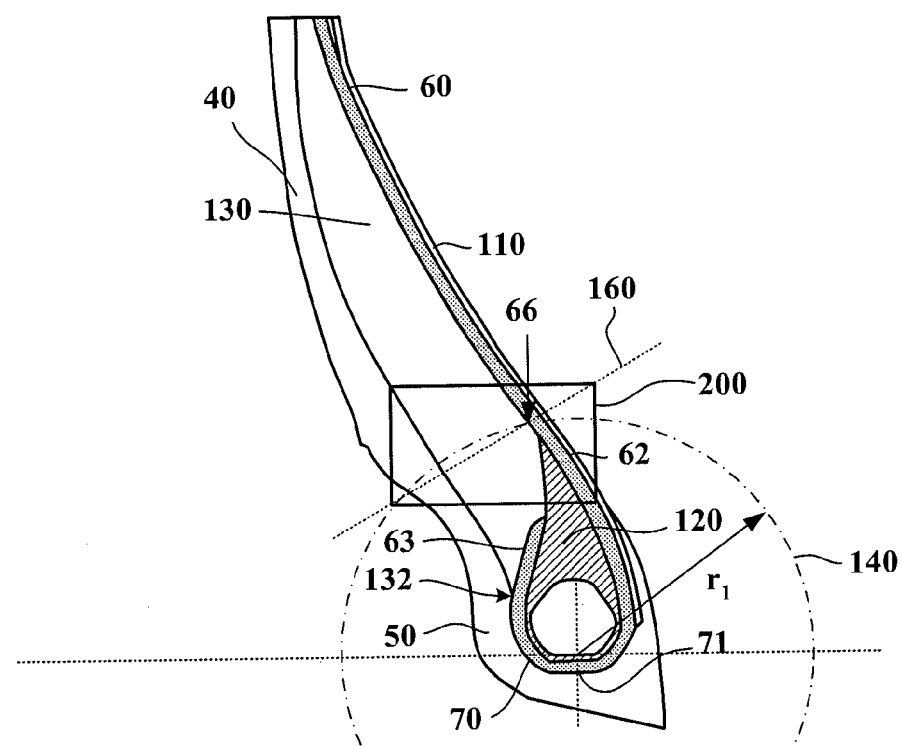
FIGS. 8 and 9 illustrate how the change of the thickness of the entity formed by the apex and by the outer strip of a tire according to an embodiment of the invention is determined.
Figure 9:
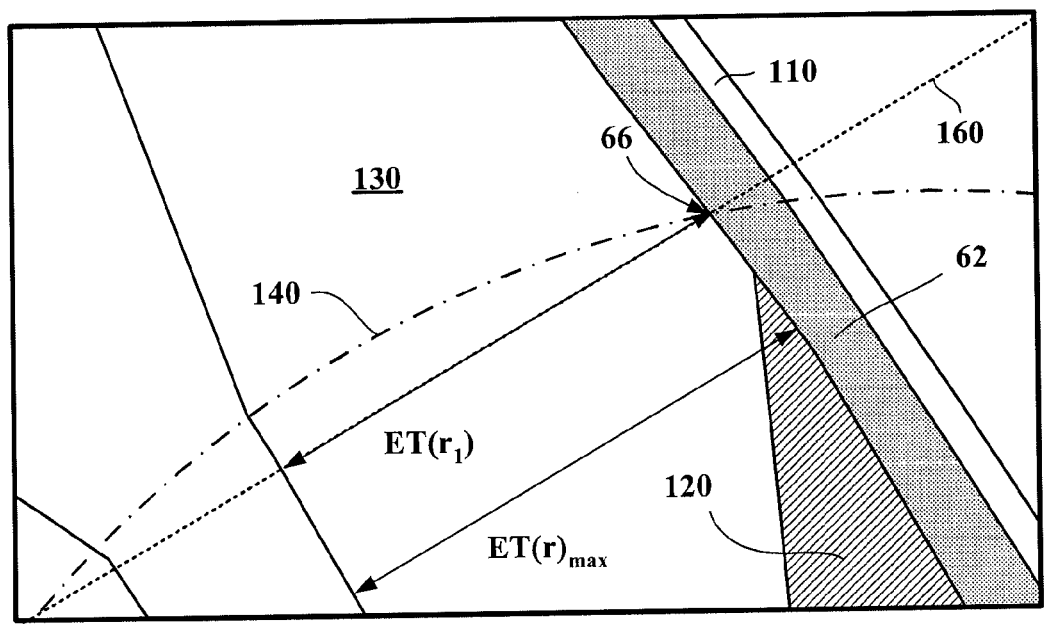

FIGS. 8 and 9 illustrate how this thickness is determined; FIG. 9 is an enlargement of the region contained in the box 200 in FIG. 8. Tracking once again along the interface between the main portion 62 of the carcass reinforcement 60 and the apex 120, each point on this interface is a distance r from the radially innermost point 71 of the annular reinforcing structure 70. For a given distance $r_1$, the corresponding point 66 of the interface is found by plotting a circle 140 of radius $r_1$ around the radially innermost point 71 of the annular reinforcing structure 70, as has been depicted in FIG. 8. Next, the direction 160 perpendicular to the main portion 62 of the carcass reinforcement 60 which passes through the point 66 of the interface is plotted. The thickness $ET(r_1)$ of the entity formed by the apex 120 and the outer strip 130 corresponds to the length of the intersection of the direction 160 with this entity. The thickness of the wrapped-around portion 63, if the direction 160 intersects it, is disregarded.

In a tire according to the invention, the thickness ET(r) changes in such a way that, in the range of distances r comprised between 25 and 45% of the height H of the tire, the variation in the thickness $$\frac{\partial ET(r)}{\partial r}$$

is negative and has an absolute value that is greater than or equal to 0.25 mm/mm (i.e. the value is below −0.25 mm/mm) over at least 4% of the height H of the tire.

Figure 10:
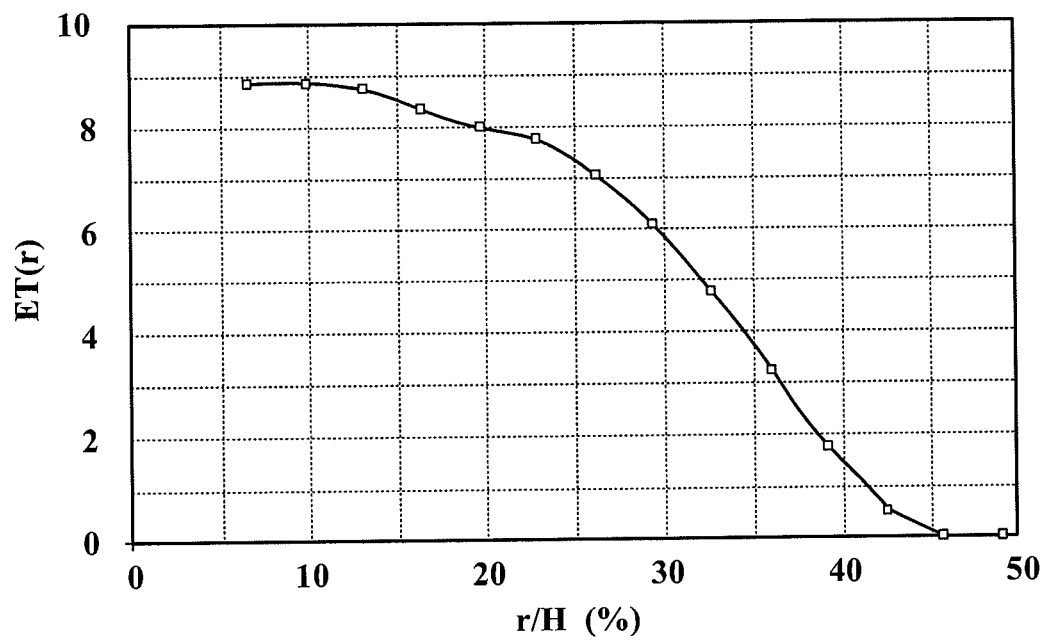
FIGS. 10 and 11 show the change of the thickness of the entity formed by the apex and by the outer strip of a tire according to an embodiment of the invention.

FIG. 10 depicts the change of the thickness ET(r) as a function of the distance r/H, both for the tire according to an embodiment of the invention depicted in FIG. 5 and for the reference tire depicted in FIG. 3; indeed, the curves overlay one another perfectly.

Figure 11:
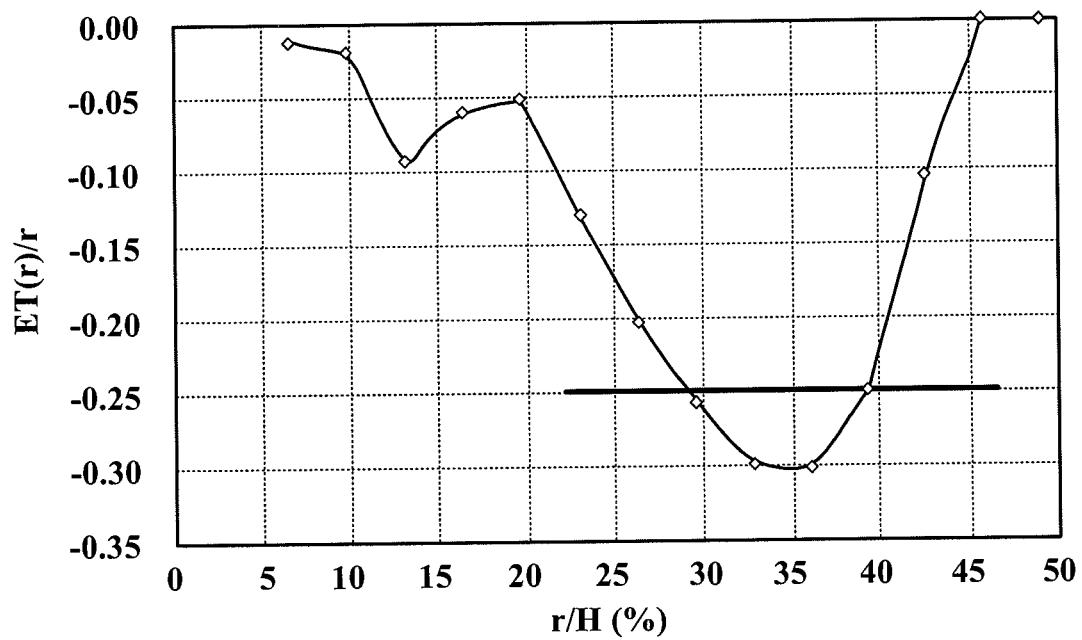

The function $$\frac{\partial ET(r)}{\partial r}$$

as a function of the radius r, is depicted in FIG. 11. It may be seen that, in the range of distances r comprised between 25 and 45% of the height H of the tire, the variation in thickness $$\frac{\partial ET(r)}{\partial r}$$

is negative and has an absolute value that is greater than or equal to 0.25 mm/mm over almost 10% of the height H of the tire.

Finally, in a tire according to the invention, the annular reinforcing structure 70 has a maximum axial width DE (see FIG. 6) such that the ratio $$\frac{ET(r)_{max} - DE}{ET(r)_{max}},$$

where $ET(r)_{max}$ is the maximum value of the thickness ET(r) (see FIG. 9), is less than or equal to 10%. In this instance, this ratio is equal to 6%.

It must be emphasized that the invention is not restricted to one particular type of bead wire. It can be implemented with braided bead wires, but can also be implemented with "bead bundles" using round wire (as disclosed, by way of example in document CA 2 026 024) or square wire (document U.S. Pat. No. 3,949,800 represents an example of this), made up of an individual wire or strand coated with rubber, wound in a helix with contiguous turns stacked on one another, the plurality of superposed layers forming an endless reinforcing annulus of polygonal cross section. The use of bead wires like those disclosed in document WO 01/54929, and more particularly of 3-4-3-2 construction has proven to be particularly advantageous because it allows the wire to be sufficiently engineered without any unnecessary addition of mass.

The applicant has conducted comparative tests on tires of 235/65 R 17 size. A tire with a bead as depicted in FIG. 3 was compared with a tire with a bead as depicted in FIG. 5. The two tires had the same endurance, the same cornering stiffness and the same rolling resistance. The tire according to an embodiment of the invention allowed industrial cost saving of around 5% on the carcass reinforcement by comparison with the tire according to the prior art. This reduction can be explained by the reduction in the distance DEC; the nature and special shape of the apex means that reducing this distance does not in any way penalize the performance of the tire.

The invention claimed is:

1. A tire comprising:

two beads configured to come into contact with a rim, each bead comprising at least one annular reinforcing structure;

two sidewalls extending the beads radially outwards, the two sidewalls meeting in a crown comprising a crown reinforcement surmounted by a tread; and one single carcass reinforcement extending from the beads through the sidewalls as far as the crown, the carcass reinforcement comprising a plurality of carcass reinforcing elements, the carcass reinforcement being anchored in the two beads by a turn-up around the annular reinforcing structure so as to form, within each bead, a main portion and a wrapped-around portion, each wrapped-around portion extending radially outwards as far as an end situated a radial distance DEC from the innermost point of the annular reinforcing structure of the bead, the radial distance DEC being less than or equal to 10% of the radial height H of the tire;

wherein each bead comprises an apex made from a rubber composition that has an elastic modulus greater than or equal to 40 MPa, the apex being situated essentially radially on the outside of the annular reinforcing structure and at least partially between the main portion and the wrapped-around portion of the carcass reinforcement, the apex extending radially as far as a radially outer end of the apex, the radially outer end of the apex being situated a radial distance DEE1 from the radially innermost point of the annular reinforcing structure of the bead, the radial distance DEE1 being greater than or equal to 10% and less than or equal to 15% of the radial height H of the tire, wherein each bead further comprises an outer strip made of a rubber composition that has an elastic modulus G' less than or equal to 15 MPa and a viscous modulus G" such that:

G" [MPa] 0.2·G' [MPa] −0.2 MPa, the elastic and viscous moduli being measured at 23° C., the outer strip being situated axially on the outside of the wrapped-around portion of the carcass reinforcement, the outer strip extending between a radially inner end of the outer strip and a radially outer end of the outer strip, the radially inner end of the outer strip being situated at a radial distance DEI2 from the radially innermost point of the annular reinforcing structure of the bead, the radial distance DEI2 being less than or equal to 20% of the radial height H of the tire, the radially outer end of the outer strip being situated at a radial distance DEE2 from the radially innermost point of the annular reinforcing structure of the bead, the radial distance DEE2 being greater than or equal to 25% of the radial height H of the tire, wherein the apex has an axial thickness E(r), this axial thickness corresponding to the length of the intersection of the apex with an axial direction, r denoting the distance separating the point of intersection of said axial direction with the main portion of the carcass reinforcement from the radically innermost point of the annular reinforcing structure, the thickness E(r) being a substantially linear function of r, wherein the entity formed by the apex and the outer strip has a thickness ET(r), this thickness corresponding to the length of the intersection of the direction perpendicular to the main portion of the carcass reinforcement with said entity, r denoting the distance separating the point of intersection of said direction perpendicular to the main portion of the carcass reinforcement with the main portion of the carcass reinforcement from the radially innermost point of the annular reinforcing structure, wherein the thickness ET(r) changes in such a way that, in the range of distances r comprised between 25 and 45% of the height H of the tire, the variation in thickness $$\frac{\partial ET(r)}{\partial r}$$

is negative and has an absolute value that is greater than or equal to 0.25 mm/mm over at least 4% of the height H of the tire; and wherein said at least one annular reinforcing structure has a maximum axial width DE such that the ratio $$\frac{ET(r)_{max} - DE}{ET(r)_{max}},$$

wherein $ET(r)_{max}$ is the maximum value of the thickness ET(r), is less than or equal to 10%.

2. The tire of claim 1, wherein the radial distance DEC is less than or equal to 8% of the radial height H of the tire.

3. The tire of claim 1, wherein the radial distance DEE2 is greater than or equal to 40% and less than or equal to 45% of the radial height H of the tire.

4. The tire of claim 1, wherein in the range of distances r comprised between 25 and −45% of the height H of the tire, the variation in the thickness $$\frac{\partial ET(r)}{\partial r}$$

is negative and has an absolute value that is greater than or equal to 0.3 mm/mm over at least 4% of the height H of the tire.

5. The tire of claim 1, wherein the ratio $$\frac{ET(r)_{max} - DE}{ET(r)_{max}}$$

is less than or equal to 7%.

* * * * *